(12) United States Patent
Chow

(10) Patent No.: US 9,081,561 B2
(45) Date of Patent: Jul. 14, 2015

(54) METHOD FOR IMPROVING EXECUTION PERFORMANCE OF MULTIPLY-ADD INSTRUCTION DURING COMPILING

(71) Applicant: SHENZHEN ZHONGWEIDIAN TECHNOLOGY LIMITED, Nanshan, Shenzhen, Guangdong (CN)

(72) Inventor: Fred Chow, Guangdong (CN)

(73) Assignee: SHENZHEN ZHONGWEIDIAN TECHNOLOGY LIMITED, Shenzhen, Guangdong (CN)

( * ) Notice: Subject to any disclaimer, the term of this patent is extended or adjusted under 35 U.S.C. 154(b) by 0 days.

(21) Appl. No.: 14/257,271

(22) Filed: Apr. 21, 2014

(65) Prior Publication Data

US 2014/0325190 A1 Oct. 30, 2014

(30) Foreign Application Priority Data

Apr. 26, 2013 (CN) .......................... 2013 1 0150714

(51) Int. Cl.
G06F 9/45 (2006.01)
G06F 9/30 (2006.01)

(52) U.S. Cl.
CPC ................................... *G06F 9/3001* (2013.01)

(58) Field of Classification Search
None
See application file for complete search history.

(56) References Cited

U.S. PATENT DOCUMENTS

| 7,739,480 | B2 * | 6/2010 | Liao et al. ........................ 712/3 |
| 8,166,450 | B2 * | 4/2012 | Fuhler et al. ................... 717/101 |
| 8,832,671 | B1 * | 9/2014 | Patney et al. .................. 717/151 |
| 2005/0055394 | A1 * | 3/2005 | Worley .......................... 708/523 |
| 2007/0074186 | A1 * | 3/2007 | Muthukumar et al. ........ 717/140 |
| 2008/0005722 | A1 * | 1/2008 | Matsuzaki ..................... 717/122 |
| 2008/0313438 | A1 * | 12/2008 | Luick ............................ 712/222 |
| 2011/0258615 | A1 * | 10/2011 | Sollich .......................... 717/146 |
| 2011/0258616 | A1 * | 10/2011 | Sollich .......................... 717/146 |
| 2012/0079252 | A1 * | 3/2012 | Sprangle ....................... 712/222 |
| 2014/0149720 | A1 * | 5/2014 | Muff et al. .................... 712/222 |

* cited by examiner

*Primary Examiner* — Isaac T Tecklu
(74) *Attorney, Agent, or Firm* — Jackson IPG PLLC; Demian K. Jackson

(57) ABSTRACT

The present invention relates to a method for improving execution performance of multiply-add instructions during compiling, comprising the following steps of: compiling a source code by a compiler to acquire internal representation; optimizing; generating a machine code on the basis of a target processor, and allocating a physical register to a pseudo-register in the machine code; and improving results of register allocation to multiply-accumulate instructions. The method for improving execution performance of multiply-add instructions during compiling provided by the present invention has the following advantages: the compiler is allowed to realize procedure optimization by acquiring the optimal MAC (multiply-accumulate) instruction use gain.

10 Claims, 2 Drawing Sheets

METHOD FOR IMPROVING EXECUTION PERFORMANCE OF MULTIPLY-ADD INSTRUCTION DURING COMPILING

TECHNICAL FIELD OF THE INVENTION

The present invention relates to a method for compiling a source code, more particularly to a method for improving execution performance of multiply-add instructions during compiling.

BACKGROUND OF THE INVENTION

In programs of a computer, for example, in the scalar product, matrix multiplication and the solving of many polynomial forms, it is very common to obtain a result after multiplying two numbers and then adding another number. As the expression a×b+c occurs frequently and needs to be operated, most of popular processors provide multiply-add instructions (MADD) to improve the execution performance of algorithm. The MADD is used for improving the computation speed. As the MADD allows two times of operation: multiplication first and then addition, an instruction of MADD is equivalent to two instructions. As two times of operation are fused into one time of operation, the MADD may be regarded as a fused multiply-add (FMA) operation.

In general, the form of an MADD instruction is as follows:

$$d = a \times b + c.$$

Here, as it is required to designate 3 operands and 1 result, during compiling an instruction, more bytes need to be used in the instruction, and more complex hardware implementation will be caused. This is because a third hardware access port is required to be added for the instruction. Another choice is to regard the MADD as a multiply-accumulation (MAC) operation, so that products are accumulated by summation. In this case, the processor provides a special register, i.e., an accumulator (acc) that has one implicit operand and one implicit MAC result. The form of the MAC is as follows:

$$mac\ a\ b.$$

Here, this formula means:

$$acc = a \times b + acc.$$

As acc is a special register, the processor has to define two additional instructions, i.e., an acc initialize instruction (initacc) and an acc middle-value instruction (mvacc).

For an MAC instruction, although this form can simplify the hardware implementation, the constant use of an acc register makes the flexibility of compiling somewhat declined. When a programmer programs in a high-level language, such as C and C++, just determination on when to use MAC and when not to use MAC by a compiler makes the MAC method difficult. The insufficient resource of the accumulator usually is a decisive factor of using MAC. Therefore, although no any additional hardware structure is required for the MAC instruction, the actual identification of an executable MAC instruction after compiling the source code rarely occurs due to the restriction of the accumulator in the prior art, resulting in low execution gain.

SUMMARY OF THE INVENTION

A technical problem to be solved by the present invention is, in view of the above defects on complex hardware structure, limited execution and low execution gain in the prior art, to provide a method for improving execution performance of multiply-add instructions during compiling, which has high execution gain without any need of hardware improvement.

To solve the technical problem, the present invention employs the following solutions: a method for improving execution performance of multiply-add instructions during compiling is provided, comprising the following steps of:

A) compiling a source code by a compiler, converting the source code into an internal representation, and optimizing the internal representation;

B) generating a machine code on the basis of a target processor, and allocating a physical register to a pseudo-register in the machine code; and C) improving allocation of registers to multiply-accumulate instructions, respectively: allocating at least one idle accumulator to the pseudo-register in the current multiply-accumulate instruction according to set conditions if there is at least one idle accumulator, so that the pseudo-register is allowed to execute multiply-accumulation using the accumulator; and allocating a general register to the current multiply-accumulate instruction if there is no idle accumulator currently, so that the multiply-accumulate instruction is allowed to be realized through two independent operations.

Further, in Step A), in a middle-end phase of compiling the source code, all expressions, in which two numbers are multiplied and the multiply then adds another number, in the source code, are converted into a form of multiply-add instructions.

Further, Step B) further comprises: converting the multiply-add instructions into multiply-accumulate instructions by adding one copy instruction to all the multiply-add instructions.

Further, in Step B), a physical register is allocated to the pseudo-register in such a way that: a priority-based register allocation algorithm is employed to preferentially allocate a register having a maximum number of execution times when a plurality of pseudo-registers compete for a limited number of physical registers, and preferentially use a physical register having a maximum gain when a plurality of physical registers can be configured to one pseudo-register.

Further, interpretation of the maximum performance gain comprises: judging whether there is a pseudo-register in a multiply-accumulate instruction; configuring a general physical register to the multiply-accumulate instruction, if there is no pseudo-register in the multiply-accumulate instruction; and, configuring an accumulator to the pseudo-register when there is at least one idle accumulator currently, if there is a pseudo-register in the multiply-accumulate instruction.

Further, Step C) further comprises:

introducing one new pseudo-register for storing intermediate results if no accumulator is allocated to a multiply-accumulate instruction, and executing the two operations in the source code of the multiply-accumulate instruction, respectively.

Further, Step C) further comprises: converting an instruction into an accumulator initialize (initacc) instruction if the instruction is a copy instruction, in the case that an accumulator is allocated as a general instruction operation result; or otherwise, replacing the accumulator with a new pseudo-register, inserting an accumulator initialize (initacc) instruction, and using the pseudo-register in the general instruction to initialize the accumulator.

Further, Step C) further comprises: converting an instruction into an accumulator value move-out instruction when the operand of the copy instruction is an accumulator.

Further, Step C) further comprises: introducing one pseudo-register and inserting an accumulator value move-out instruction (mvacc) for moving the accumulator value to the pseudo-register in prior to the instruction, when the operand of an instruction is an accumulator; and then replacing the accumulator with the pseudo-register to in an operation in which all accumulators in the instruction appear.

Further, the multiply-add instructions comprise an MADD instruction, an MSUB instruction, a NMADD instruction or/and a NMSUB instruction.

The method for improving execution performance of multiply-add instructions during compiling provided by the present invention has the following advantage: it is ensured that the compiler will not miss any chance of using the MAC instruction during the optimization of programming performance. When multiple applicants desire to use MAC, the advantage of the method is that the compiler is allowed to convert most of the applicants into MACs. The unselected applicants are maintained through isolated multiply and add instructions. During processing, the compiler also generates an effective code to move data in a general register to an acc or otherwise, and keeps the correctness of running the code when the acc is used. In short, by the method, the compiler is allowed to realize procedure optimization by acquiring the optimal MAC instruction use gain.

DETAILED DESCRIPTION OF THE PREFERRED EMBODIMENTS

The embodiments of the present invention will be further described as below with reference to accompanying drawings.

Figure 1:
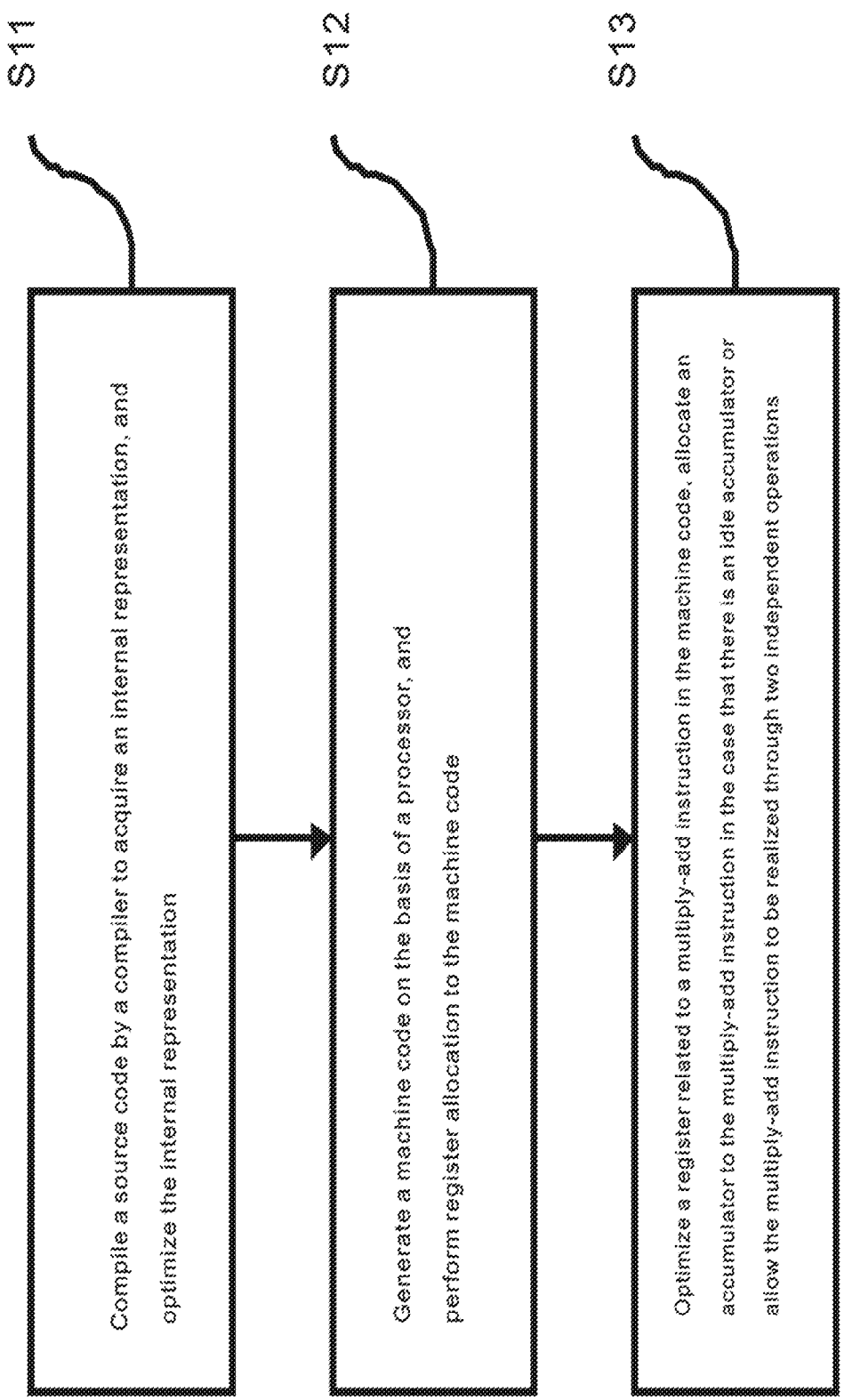
FIG. 1 is a flowchart of an embodiment of a method for improving execution performance of multiply-add instructions during compiling according to the present invention.

As shown in FIG. 1, an embodiment of a method for improving execution performance of multiply-add instructions during compiling according to the present invention comprises the following steps:

S11: A source code is converted into an internal representation (IR) and then the internal representation is optimized. In this step, the source code is converted in a compiler into internal representation, and the internal representation is optimized. Generally, the compiling of a source code in a compiler is divided into multiple phases. In the font-end phase, a program is converted into an IR of the compiler from its original language. In the middle-end phase, the program performance of the converted IR is optimized, wherein, as there are many different optimization algorithms and theories, there are many corresponding and one-by-one optimization steps in the middle-end phase. The front-end phase and the middle-end phase do not depend on a processor as the form of the IR is not involved with the special performance of any target processor. In this embodiment, it is required to convert the structure of MADDs in the middle-end phase as far as possible, that is, when a product is regarded as the operand of an addition, two operations, i.e., multiplication and addition, have to be converted into a single MADD operation without any limit in the middle-end phase. That is, in S11, all instructions, involving that a product is regarded as the operand of an addition, are converted into a single MADD instruction. The conversion may be implemented by pattern matching or other technologies.

S12: A machine code on the basis of a processor is generated, and register allocation is performed to the machine code. In this step, based on the obtained IR, the compiler generates a machine code on the basis of a target processor, and then allocates a physical register according to the used pseudo-register (preg). For the compiler, the beginning of this step may be regarded as a back-end phase related to a target processor or based on a target processor. In this embodiment, the IR obtained from the expansion of the compiler is the machine code of the target processor. In the remaining of the back-end phase, optimization is performed to the obtained machine code. A register in the finally obtained machine code is represented as a pseudo-register. In this step, the application of a pseudo-register is not limited. In the register allocation phase, a physical register is allocated to the pseudo-register, so it is required to allocate a practical register to the above code. The allocation process of the physical register may include: inserting an additional instruction to move varied data in the register and memory so that the limitation resulted from a fixed number of practical registers is overcome. As an action of the instruction accessing to the memory in a manner of uploading and storing is minimized, loading a plurality of data to the register may improve the running performance of a program. In addition, as there is a long delay time and it is likely to cause cache miss, the additional instruction may prolong the execution of a program, and it is likely to reduce the performance when the memory accesses to the instruction.

In the initial phase of the generation of the machine code, as there are an unlimited number of pseudo-registers, the generated code series may be regarded to be open. This is because it is manifested that there are sufficient registers (i.e., pseudo-registers) for storing all data values. Based on this, a fact that there is only one acc register may be ignored. In practices, many different register allocation algorithms are applied to the compiler. Although these algorithms have different operational methods, they have some common points. For example, a fixed number of practical registers provided by a target processor are allocated to an unlimited number of pseudo-registers; and, when a physical register is allocated to more than one pseudo-register candidate, it is necessary to ensure that there is no conflict in application. A sufficient condition is that there is no crossed or overlapped place during the survival periods of two pseudo-registers. When no physical register, which may be allocated, is configured to a pseudo-register, the generated code will overflow the pseudo-register and then configure it to the memory (that is, the memory is allocated to the pseudo-register), so that the additional instruction is required to perform read/write operations to the local memory. Even though these configurations are optimized, it is possible to prolong the running time.

In this embodiment, priority-based coloring register allocation algorithm (PCRAA) is selected, characterized in that when a plurality of pseudo-registers compete for a limited number of physical registers, a register having a maximum number of execution times is used as a register to be configured next; and, when a plurality of physical registers can be configured to one pseudo-register, different performances realized by each register are compared, and a register having a maximum gain is selected and then configured to the pseudo-register.

It is to be mentioned that, when the IR is converted into a machine code, this step further include: converting all the multiply-add instructions (MADDs) into multiply-accumulate (MACS) instructions by adding one copy instruction. Thus we can use the MADDs as MAC instructions. As a copy instruction is contained, additional operands in the MADDs are different from the results from the MADDs at any time.

Previously, $d = a \times b + c$ (an MADD)

The above expression is performed with MADD-to-MAC conversion:

$d = c$ $d = a \times b + c$ (an MADD).

It is to be noted that, the MAC instruction at this time has the third operand (d in the above formula) stipulated explicitly, this is because it is not limited as acc. In this embodiment, it is planed to introduce the operand into the register allocation. The register allocation may refer to allocation of any register to the operand freely. After the register allocation, a section of improved code is generated, and then converted to make it conform to the limitations of the processor. The characteristics of the acc are omitted as implicit conditions when a final MAC instruction is issued.

In this step, after the above conversion, a register is allocated based on the priority-based coloring register allocation algorithm. During allocation, in addition to the above principle, the register allocation is performed deepening on the following principle: the acc is regarded as a general register, if there is no pseudo-register in the results of any MAC instruction, the acc is not allocated to the instruction; and, if there is one pseudo-register in the results of any MAC instruction, and if an acc is idle during the survival period of the pseudo-register, the acc register is allocated to the instruction. In combination with the principle and the original register allocation principle of PCRAA, configuring an acc to an MAC instruction series may obtain the maximum performance gain. For example, if an MAC instruction is in a cycle, an acc will be allocated to a pseudo-register in the MAC instruction through the register allocation, this is because this pseudo-register is in the cycle all the time and has a higher priority; and, the accumulation or the presence (or use) of an MAC cascade instruction on a same pseudo-register for many times allows the pseudo-register to have a higher priority. In this step, interpretation of the maximum performance gain comprises: judging whether there is a pseudo-register in a multiply-accumulate instruction; configuring a general physical register to the multiply-accumulate instruction, if there is no pseudo-register in the multiply-accumulate instruction; and, configuring an accumulator to the pseudo-register when there is at least one idle accumulator currently, if there is a pseudo-register in the multiply-accumulate instruction.

As PCRAA designates a register to a pseudo-register in a priority order of pseudo-registers, a register having low priority and conflicting with the register having high priority will be not designated to an acc. Meanwhile, the PCRAA will run until no register may be designated, so that an acc can be designated as long as possible until a pseudo-register appears as the result of any MAC instruction. Therefore, the acc is applied to the MAC instruction.

S13: A register related to multiply-add instructions in the machine code is optimized, and the register is allocated with an accumulator in the case that there is any idle accumulator, or realized through two independent operations. In this step, the register allocation of multiply-accumulate instructions in each section of the machine code is improved. If there is at least one idle accumulator, at least one idle accumulator is allocated to the pseudo-register in the current multiply-accumulate instruction according to set conditions, so that the pseudo-register is allowed to execute multiply-accumulation using the accumulator; and, if there is no idle accumulator currently, a general register is allocated to the current multiply-accumulate instruction, so that the multiply-accumulate instruction is allowed to be realized through two independent operations. It is to be mentioned that, the optimization in this step is applicable to the whole machine code obtained from the source code. That is, all the machine codes will be processed like this.

Figure 2:
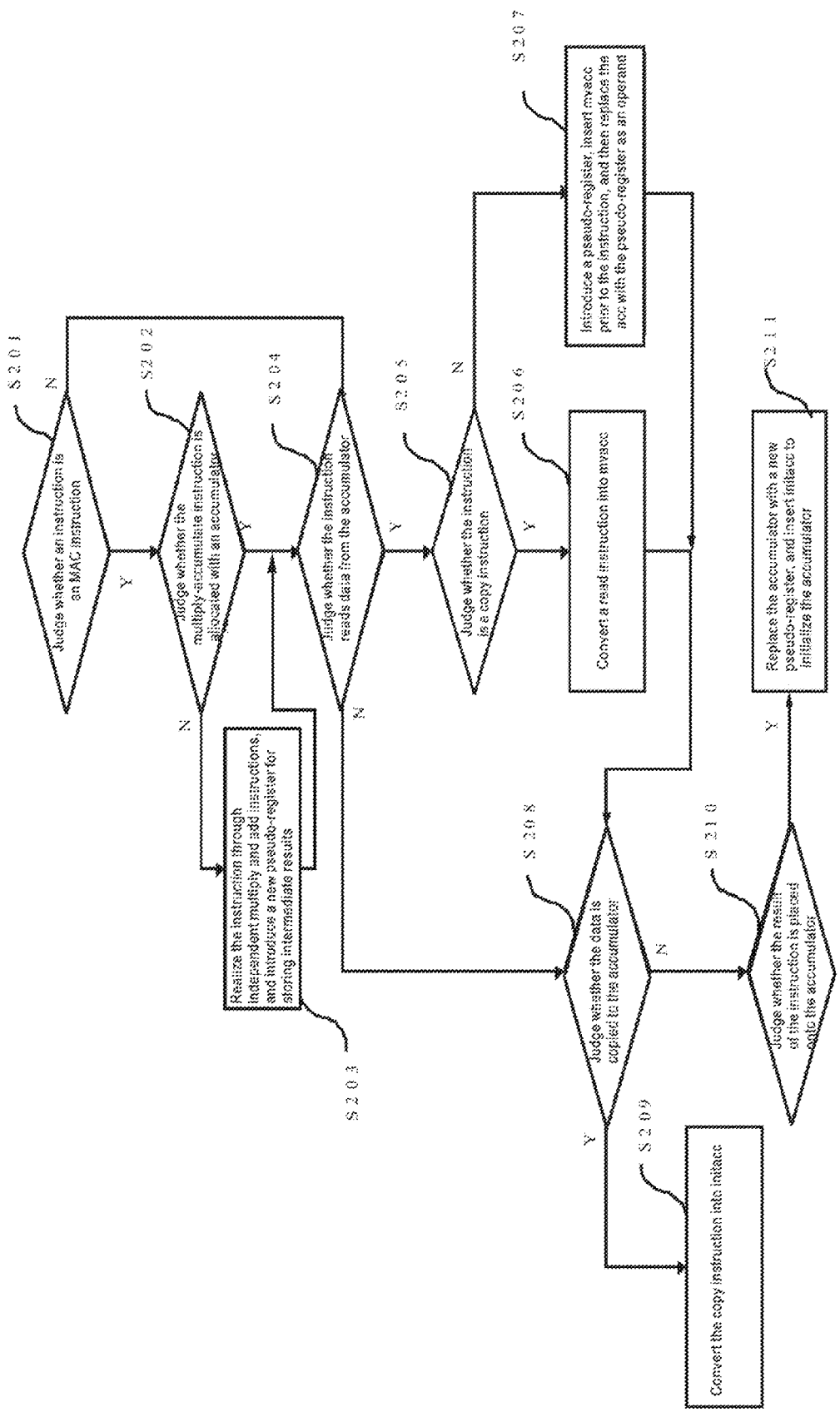
FIG. 2 is a flowchart of improving register allocation in the embodiment.

As shown in FIG. 2, in this embodiment, the above S13 may further include the following steps:

S201: It is checked whether each instruction is a multiply-accumulate instruction; if so, S202 is executed; and if not, S204 is executed.

S202: It is checked whether each multiply-accumulate instruction is allocated with an accumulator. In this step, it is judged whether each multiply-accumulate instruction is allocated with an accumulator; if so, S204 is executed; and if not, S203 is executed, and then S204 is executed.

S203: A new pseudo-memory for storing intermediate results is introduced by using independent multiply and add instructions. In this step, as no acc is allocated to the multiply-accumulate instruction, the instruction cannot be realized by one instruction. Therefore, it is required to use two independent instructions (i.e., multiple instruction and add instruction, respectively) to perform two operations thus to obtain a result. In this step, it is required to introduce a new pseudo-register for storing intermediate results of the two operations.

For example, a pseudo-register is introduced to store a product, then the add operation is performed to the product as an augend and an addend, and the final result is obtained.

S204: It is checked whether the instruction reads data from the accumulator; if so, S205 is executed; and if not, S208 is executed.

S204: It is checked whether the instruction is a copy instruction; if so, S206 is executed; and if not, S207 is executed.

S206: The instruction is converted into mvacc. In this step, as the data is read from the accumulator, the instruction is converted into the mvacc instruction special for acquiring data from the accumulator. After the step is executed, skip to S208.

S207: A pseudo-register is introduced, and an mvacc instruction is inserted prior to the instruction, then the value in the acc is replaced with an operand stored in the pseudo-register. In this step, a new pseudo-register is introduced and an mvacc instruction is added. Then, the data in the acc is sent to the pseudo-register via the mvacc instruction, and the value in the acc is replaced by the operand stored in the pseudo-register. That is, the acc is replaced with the pseudo-register obtaining the data for operation. This is because the acc cannot be applied to the operation code of a general instruction.

S208: It is determined whether the data is copied to the accumulator; if so, S209 is executed; and if not, S210 is executed.

S209: The instruction is converted into initacc. In this step, the operation to the accumulator is converted into initialization of the accumulator. The initacc instruction is an instruction specific for initializing the accumulator. By the initacc instruction, the original value in the accumulator is eliminated, and then the value to be copied is sent to the accumulator.

S210: It is checked whether the general instruction (except the multiply-accumulate instructions) sends the result to the accumulator; and if so, S211 is executed.

S211: The accumulator is replaced with a new pseudo-register and then initialized. As the acc cannot appear in a general instruction, the accumulator is replaced with a new pseudo-register, and then the initacc is inserted to initialize the accumulator.

It is to be mentioned that, in FIG. 2, S201-S211 are performed in a certain order, to be convenient for description. Actually, the above steps may be classified into several groups. Steps in each group are performed in a certain order, while the groups may be performed in the above-mentioned order, in parallel, or in an order other than the above order. For example, a grouping method is as follows: S201, S202 and S203 form a group, S208, S209, S210 and S211 form a group, and S204, S205, S206 and S207 form a group. These groups may be executed coordinately or in parallel, or may be executed in a certain regular order (an order different from the above order).

In addition, in this embodiment, to be convenient for describing and understanding, there is no subsequent step after some ones among the steps, for example, S209, S210 and S211. In practices, the analysis of a next instruction will be performed after these steps (in accordance with the steps in FIG. 2).

In short, after the successful register allocation, it is required to traverse codes to find the following conditions and then perform a necessary improvement to these conditions: for an MAC instruction allocated with no acc, the MAC is executed as independent MUL and ADD instructions, respectively, and it is required to introduce a new pseudo-register for storing intermediate results of the MUL instruction; for a general instruction allocated with acc as a result, if the instruction is a copy instruction, the instruction is converted into initacc; in addition, a pseudo-register is introduced to replace the acc, and initacc is inserted to initialize the acc; for a copy instruction having an operand of acc, the instruction is converted to mvacc; if the operand in the instruction is acc, a pseudo-register is introduced prior to the instruction, and mvacc is inserted, and then all events of the acc are replaced with the operand of the new pseudo-register and the operand is substituted into the instruction.

As the acc is not a general register essentially, the latter three of the above conditions are required. During the whole compiling, initacc and mvacc are required to appear in a program sequence at first time.

As a new pseudo-register is introduced, it is required to perform register allocation to the new pseudo-register after the MAC is optimized and the physical registers are allocated. As users of the new pseudo-register are all at home (the pseudo-register is a local variable or a local parameter), the allocation to the pseudo-register is easy.

It is to be mentioned that, in the examples shown in this embodiment, the method is described by using the expression a×b+c (corresponding to an MADD instruction), but these examples do not mean that the method is applied to the expression only. The use of this expression is just for convenient description. Actually, the method in this embodiment is also applied to a×b−c (corresponding to an MSUB instruction), −((a×b)+c) (corresponding to a NMADD instruction), −((a×b)−c) (corresponding to a NMSUB instruction) or other similar expressions. When the method is applied to these expressions, corresponding operations need to be performed according to specific expressions. For convenience of description, instructions for realizing these similar expressions are called multiply-add instructions in the prior art. Meanwhile, as there are an unlimited number of accumulators in the above examples, the method in this embodiment is also applicable to the case of having a plurality of accumulators in a target processor.

For convenience of description, several practical examples are listed as below:

EXAMPLE 1

Assumed that there is an expression, i.e., $f=a+b*c+d*e,$ in a source code in the C programming language, the expression, i.e., $f=a+b*c+d*e,$ is converted in S12 into as below at first:

temp1=MADD($b,c,a$)

$f$=MADD($d,es$,temp1)

then, MADD-to-MAC conversion is performed, resulting in:

temp1=a temp1=MAC(b,c,temp1)

f=temp1 f=mac(d,e,f)

when the register allocation is executed, the following results are obtained:

acc=a acc=MAC(b,c,acc)

acc=acc acc=MAC(d,e,acc)

f=acc.

It is to be noted that, acc is allocated to temp1 and f in the above expressions, and acc=acc in the third row is not necessary.

Optimization or improvement is performed according to the method in this embodiment, resulting in:
initacc a (referring to S208 and S209)
mac b,c
mac d,e
mvacc f (referring to S204, S205 and S206).

EXAMPLE 2

Assumed that there is an expression, i.e., $c=a*b+c$ $f=d*e+f$ $c=g*h+c,$ in a source code in the C programming language, the expression, i.e., $c=a*b+c$ $f=d*e+f$ $c=g*h+c,$ is converted in S12 into as below at first:

c=MADD(a,b,c)

f=MADD(d,e,f)

c=MADD(g,h,c)

then, MADD-to-MAC conversion is performed, resulting in:

c=MAC(a,b,c)

f=MAC(d,e,f)

c=MAC(g,h,c).

when the register allocation is executed, the following results are obtained (according to the register allocation principle in this embodiment, acc is allocated to c as the priority of c is higher):

acc=c acc=MAC(a,b,acc)

f=MAC(d,e,f)

acc=MAC(g,h,acc)

c=acc.

It is to be noted that, in the above expressions, the second MAC will be converted into two independent multiply and add operations (referring to S203) as there is no available accumulator.

Optimization or improvement is performed according to the method in this embodiment, resulting in:
initacc c (referring to S208 and S209)
mac a,b
mul temp1, d,e (i.e., temp1=d*e)
add f,temp1,f (i.e., f=temp1+f)
mac g,h
mvacc c (referring to S204, S205 and S206).

The forgoing embodiments just show several implementations of the present invention, although are described more specifically and in more details, are not intended to limit the scope of the present invention. It is to be noted that, various variations and improvements may be made by an ordinary person of skill in the art without departing from the idea of the present invention, and these variations and improvements shall fall into the protection scope thereof. Therefore, the protection scope of the present invention shall be defined by the appended claims.

What is claimed is:

1. A method for improving execution performance of multiply-add instructions during compiling, comprising the following steps of:
   A) compiling a source code by a compiler, converting the source code into an internal representation, and optimizing the internal representation;
   B) generating a machine code on the basis of a target processor, and allocating a physical register to a pseudo-register in the machine code; and
   C) improving allocation of registers to multiply-accumulate instructions, respectively: allocating at least one idle accumulator to the pseudo-register in the current multiply-accumulate instruction according to set conditions if there is at least one idle accumulator, so that the pseudo-register is allowed to execute multiply-accumulation using the accumulator; and allocating a general register to the current multiply-accumulate instruction if there is no idle accumulator currently, so that the multiply-accumulate instruction is allowed to be realized through two independent operations.

2. The method for improving execution performance of multiply-add instructions during compiling according to claim 1, wherein, in Step A), in a middle-end phase of compiling the source code, all expressions, in which two numbers are multiplied and the multiply then adds another number, in the source code, are converted into a form of multiply-add instructions.

3. The method for improving execution performance of multiply-add instructions during compiling according to claim 2, wherein Step B) further comprises: converting the multiply-add instructions into multiply-accumulate instructions by adding one copy instruction to all the multiply-add instructions.

4. The method for improving execution performance of multiply-add instructions during compiling according to claim 3, wherein, in Step B), a physical register is allocated to the pseudo-register in such a way that: a priority-based register allocation algorithm is employed to preferentially allocate a register having a maximum number of execution times when a plurality of pseudo-registers compete for a limited number of physical registers, and preferentially use a physical register having a maximum gain when a plurality of physical registers can be configured to one pseudo-register.

5. The method for improving execution performance of multiply-add instructions during compiling according to claim 4, wherein interpretation of the maximum performance gain comprises: judging whether there is a pseudo-register in a multiply-accumulate instruction; configuring a general physical register to the multiply-accumulate instruction, if there is no pseudo-register in the multiply-accumulate instruction; and, configuring an accumulator to the pseudo-register when there is at least one idle accumulator currently, if there is a pseudo-register in the multiply-accumulate instruction.

6. The method for improving execution performance of multiply-add instructions during compiling according to claim 5, wherein Step C) further comprises: introducing one new pseudo-register for storing intermediate results if no accumulator is allocated to an multiply-accumulate instruction, and executing the two operations in the source code of the multiply-accumulate instruction, respectively.

7. The method for improving execution performance of multiply-add instructions during compiling according to claim 5, wherein Step C) further comprises: converting an instruction into an accumulator initialize instruction if the instruction is a copy instruction, in the case that an accumulator is allocated as a general instruction operation result; or otherwise, replacing the accumulator with a new pseudo-register, inserting an accumulator initialize instruction, and using the pseudo-register in the general instruction to initialize the accumulator.

8. The method for improving execution performance of multiply-add instructions during compiling according to claim 5, wherein Step C) further comprises: converting an instruction into an accumulator value move-out instruction when the operand of the copy instruction is an accumulator.

9. The method for improving execution performance of multiply-add instructions during compiling according to claim 5, wherein Step C) further comprises: introducing one pseudo-register and inserting an accumulator value move-out instruction for moving the accumulator value to the pseudo-register in prior to the instruction, when the operand of an instruction is an accumulator; and then replacing the accumulator with the pseudo-register to in an operation in which all accumulators in the instruction appear.

10. The method for improving execution performance of multiply-add instructions during compiling according to claim 1, wherein the multiply-add instructions comprise an MADD instruction, an MSUB instruction, a NMADD instruction or/and a NMSUB instruction.

* * * * *